(12) United States Patent (10) Patent No.: US 7,682,682 B2
Leon-Dufour et al. (45) Date of Patent: Mar. 23, 2010

(54) STIFFENER STOP WITH STAGGERED SLOPES AND PANEL FITTED WITH SUCH A STOP

(75) Inventors: Jean-Luc Leon-Dufour, Saint Lys (FR); Bruno Sarpy, Fenouillet (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 11/061,181

(22) Filed: Feb. 18, 2005

(65) Prior Publication Data

US 2005/0211846 A1 Sep. 29, 2005

(30) Foreign Application Priority Data

Feb. 20, 2004 (FR) .................................. 04 01711

(51) Int. Cl.
*B32B 5/00* (2006.01)
*B32B 7/00* (2006.01)
*B64C 1/00* (2006.01)
*B64C 1/06* (2006.01)
*E04C 2/38* (2006.01)

(52) U.S. Cl. .................. 428/119; 29/525.01; 52/630; 52/800.1; 52/801.1; 52/801.11; 244/119; 244/129.1; 244/131; 244/117 R; 428/98; 428/116

(58) Field of Classification Search .................. 428/119, 428/98, 116; 52/800.1, 801.1, 801.11, 630; 244/119, 129.1, 131; 29/525.01
See application file for complete search history.

(56) References Cited

U.S. PATENT DOCUMENTS

| | | | | |
|---|---|---|---|---|
| 1,431,521 A | * | 10/1922 | Hall | 52/634 |
| 4,180,232 A | * | 12/1979 | Hardigg | 249/60 |
| 4,223,053 A | * | 9/1980 | Brogan | 428/34.5 |
| 5,148,649 A | * | 9/1992 | Cipriano | 52/656.5 |
| 6,309,732 B1 | * | 10/2001 | Lopez-Anido et al. | 428/178 |

FOREIGN PATENT DOCUMENTS

GB 2 072 579 A 10/1981

* cited by examiner

*Primary Examiner*—Brent T O'Hern
(74) *Attorney, Agent, or Firm*—Patterson, Thuente, Skaar & Christensen, P.A.

(57) ABSTRACT

The object of this invention is a stiffener stop in particular for a primary structural panel of the "skin+stiffener" type for aircraft, said stop consisting of an initial slope connected to the normal height of the stiffener and a final slope, wherein at least one interval having a slope nearly equal to zero with respect to the plane of the base skin in the stop area is inserted between the two aforesaid slopes.

10 Claims, 1 Drawing Sheet

STIFFENER STOP WITH STAGGERED SLOPES AND PANEL FITTED WITH SUCH A STOP

RELATED APPLICATION

The present application claims priority to French Application No. 04 01711 filed Feb. 20, 2004.

TECHNICAL FIELD

The present invention generally refers to panels of primary aircraft structures of the "skin+stiffener" type and particularly to the extremities of these stiffeners called stiffener stops.

BACKGROUND ART

In standard wing junction connection areas or in particular areas such as near a passage of a frame, a pump opening, etc., the stiffeners must be stopped so that the structure assumes a flat plate geometry.

The stress supported by this stiffener is then transferred towards the underlying skin which is reinforced locally so as to withstand the excess load.

These "stiffener stops" cause local concentrations of stress likely to lead to tears or separations of the stiffener from the underlying skin. These specific areas must therefore be dimensioned with great prudence and consequently require reinforcements.

The problem to be solved is to define a stiffener stop shape that is compatible with the level of stress in the area and requires the least reinforcement.

The stops of conventional stiffeners are stops having a single slope.

In this type of stop, the problems involve balancing the behavior under traction with the behavior under compression. The lower the slope of the stop, the better is its behavior under traction but the poorer is its behavior under compression.

In another type of stiffener stop, which is also known, a double slope is provided, with the first slope being appreciably greater than the second.

While this solution yields the correct behavior toward compressive stress, the behavior under traction remains poor.

In fact, and as various studies have shown, the excess stress at the end of the stiffener remains directly related to the stress supported by the stiffener and, although the current stop designs make it possible to favor traction or compression, the variations in strength are relatively small and do not make it possible to obtain a really powerful stiffener stop, considering the type of panel that is involved, which is a self-stiffened carbon panel which is particularly inclined to separate.

SUMMARY OF THE INVENTION

The present invention proposes a solution which makes it possible to obtain a resistance against tensile stress that is significantly higher than that usually encountered at right angles to the final stop area, i.e. at the point where the height of the stiffener becomes zero.

To this end, the object of this invention is a stiffener for a stiffener stop area, in particular for a primary structural panel of the "skin+stiffener" type for aircraft, said stiffener stop consisting of an initial slope connected to the normal height of the stiffener and a final slope, wherein, between the two aforesaid slopes, at least one plateau with a slope nearly equal to zero with respect to the plane of the underlying skin in the area of stop is inserted.

The length of this plateau is advantageously of the order of three times the height of the stiffener.

According to one embodiment, the initial and final slopes are equal and have an angle of the order of 15° with respect to that the aforesaid plane of the skin in the area of stop.

With such a geometry a first excess stress is generated at the point of inflection between the initial slope and the plateau, but this does not affect the stiffener-skin interface because of its relative distance and thus does not generate a separation phenomenon. The plateau area makes it possible to even out the stresses before making the final stop at the end of the second slope.

Thus, the transfer of stresses from the stiffener towards the base skin occurs in two steps and in two distinct areas, so that the excess stresses are very substantially reduced in the final stop area of the stiffener at the interface between the skin and the end of the stiffener, thus reducing the risk of separation.

Other characteristics and advantages will be elucidated by the following description of an embodiment of the device of this invention, which description is provided as an example referring to the annexed drawings.

DETAILED DESCRIPTION OF THE DRAWINGS

Figure 1:
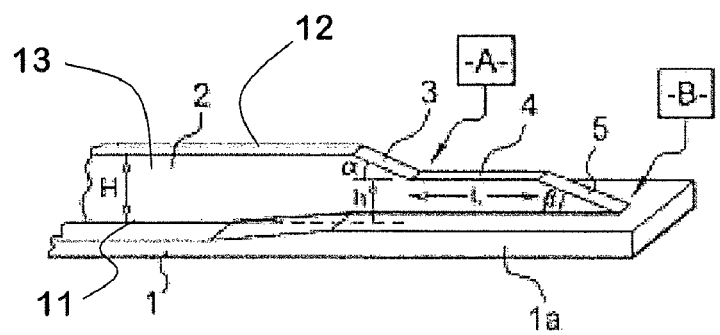
FIG. 1 is a partial perspective view of a stiffener stop area according to this invention.

FIG. 1 shows a base skin 1 of a stiffened panel consisting of a core 2 applied to one of the sides of the skin, perpendicular to the latter and having a constant normal height equal to H. Core 2 comprises a first longitudinal edge 11 directly secured to an outer base skin of the panel substantially along an entirety of first longitudinal edge 11. An opposed second edge 12 has a first height, or normal height H, with respect to first edge 11. Opposed side surfaces 13 extend between first edge 11 and second edge 12 of core 2.

To stop the stiffener 3, meaning to bring the stiffener 3 back to a height of zero with respect to the surface of panel 2 to which the stiffener 3 is applied, a first or initial slope 5 starting from the nominal height H. with a fixed slope is, in accordance with this invention, made up to an intermediate point A.

From point A, a plateau 6 is inserted parallel to the face of skin 1 and extending over a given length L.

The plateau 4 is followed by a second slope known as the final slope 7 coming to an end at the point B.

In the embodiment illustrated by FIG. 1, the skin 1 is slightly reinforced in thickness at 1a, at right angles to the stiffener stop region 8 of the stiffener 3. More precisely, the side of the skin 1 facing the stiffener 3 is slightly raised for a reason which will be explained further on.

The inclinations of the slopes 5 and 7 with respect to the upper face of the skin 1's higher thickness part 1a can be variable, identical or different.

For example, the angle α of the slope 5 and the angle β of the slope 7 are both about 15°.

The length L of the plateau 6 is advantageously of the order of three times the nominal height H of the stiffener 3.

The height h of the plateau 6, as measured with respect to the skin 1-stiffener 3 interface is advantageously of the order of two thirds of the height H.

As explained above, a first excess stress is generated at A because of the reorientation of the forces at this inflection point of the slope 5. However, this area of the point A is at a distance h from the skin 1 which is sufficient to avoid generating a separation at the skin 1-stiffener 3 interface.

The plateau 6 formed by the interval between slopes 5 and 7 makes it possible to even out the stresses before approaching the final slope 5, which is why the plateau 6 must have a sufficient length L.

A second excess stress is generated at the end of the slope 7, at the point B, but this excess stress is reduced since the stiffener stop 8 acts on a part of the stiffener 3 having a reduced height (h).

It should be noted that it is possible for several plateaus to be inserted between the points A and B, with gradually decreasing heights, with each plateau being preceded and followed by a slope.

The principle of this invention thus consists of decentralizing stresses on the stiffener stop region 8 by redistributing them to different areas (A, B, etc.) only the last of which (B) is at the skin 1-stiffener 3 interface, but is substantially reduced.

It should however be emphasized that the loss in height via a plateau 6 on the stiffener 3 is such that it weakens the latter, which is thus less stabilizing beyond the point A. This is why this reduction in the stiffener 3 strength is mitigated by an excess thickness 1*a* of the skin 1 in the stop area 8 or by resorting to splicing in this area 8 as illustrated by FIG. 2.

However, this reinforcement zone can be reduced or it may be entirely omitted if the excess stress level allows this.

Figure 2:
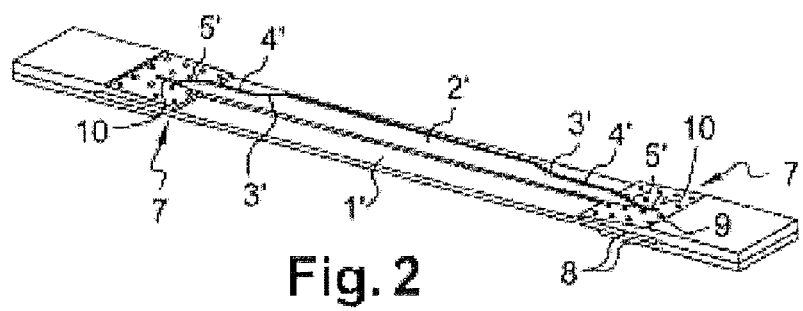
FIG. 2 represents a test sample of a panel under-surface fitted with a stiffener in conformity with this invention.
Figure 3:
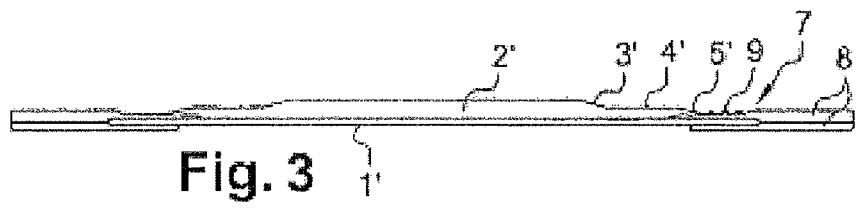
FIG. 3 is a view of a lateral elevation of the test sample from FIG. 2.
Figure 4:
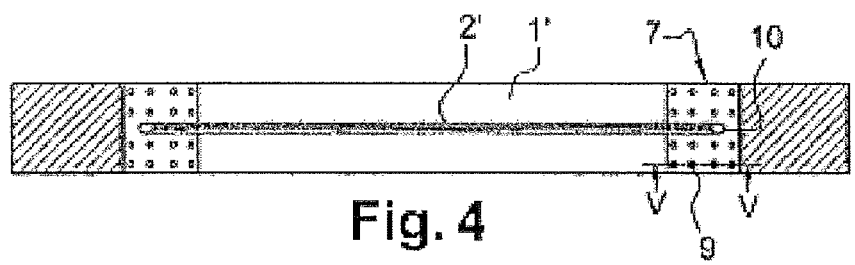
FIG. 4 is a top view of the test sample from FIG. 3.
Figure 5:
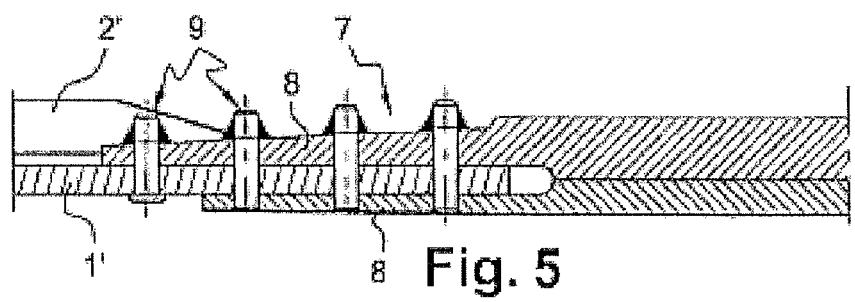
FIG. 5 is a cross-section along the line V-V of the test sample of FIG. 4.

FIG. 2 shows a test sample including a skin 1' of a panel 2' and a stiffener 3' whose ends have the stiffener stop 8' configuration of FIG. 1, namely a plateau 6' interposed between an initial slope 5' and a final slope 7'.

The skin 1' has the same thickness in the two stiffener stop areas 8' of the stiffener 3', with the reinforcement of the stop zones 8' being achieved by means of a splice 9 at the height of the final slope 7'.

To this end, the skin 1' is sandwiched between two splice portions 10 held by the screws 11, with the end portion of the stiffener 3' inserted into a slit 12 arranged in one of the splice portions 10 at least at the height of the slope 7'.

By thus enveloping the stiffener stop 8', a constant degree of stiffening perpendicular to the stiffener 3' is obtained; the first link benefits from the strengthening introduced by the junction zone of the splice 9 and therefore is able to make do with a reduced stiffener 3' height in this area.

Tests were performed on test samples of the type shown in FIG. 2, which had the following dimensional properties: angle α=angle β=15°, L=3×H and h=2 H. In comparison with a stop area of a conventional stiffener with a single slope of the same angle, the load (tensile stress) causing a separation of the skin 1'-stiffener 3' interface in the stop area 8' of stiffener 3' was observed to be 43% higher than that for a similar separation involving the conventional stop. This gain is directly proportional to the reduction (thirty eight percent) in the height of stiffener 3' with respect to the nominal height H in the area of the plateau 6, 6'.

It should be noted that the slope of the plateau 6, 6' is zero or nearly zero meaning the plateau 6, 6' can in particular have a slight downward slope of a few degrees in the direction of the end of the stiffener 3, 3', with the effects obtained then being essentially the same.

The invention claimed is:

1. A stiffened composite aircraft panel with at least one stiffener secured thereto, the stiffener comprising:
a longitudinal core having a first longitudinal edge directly secured to an outer base skin of the composite aircraft panel substantially along an entirety of the first longitudinal edge, an opposed second edge having a height with respect to the first edge, and opposed side surfaces extending between said first edge and said second edge substantially along an entirety of the core, said core having two opposed longitudinal end portions
wherein the longitudinal end portions form longitudinal stiffener stops of the stiffener, wherein at least one of said longitudinal stiffener stops comprises first and second slopes separated by a plateau, said first slope starting at the second edge at a first height and descending to a first intermediate point on the second edge at a second height less than the first height, the plateau extending from the first intermediate point to a second intermediate point on the second edge, and the second slope descending from the second intermediate point to the base skin.

2. The stiffened panel according to claim 1, wherein the plateau comprises a third slope that is substantially parallel to a surface of the base skin of the panel.

3. The stiffened panel according to claim 1, wherein the first and second slopes have equal inclinations.

4. The stiffened panel according to claim 3, wherein the inclinations of the first and second slopes are about 15°.

5. The stiffened panel according to claim 1, wherein a length of the plateau between the first intermediate point and the second intermediate point is about three times the nominal height of the core.

6. The stiffened panel according to claim 1, wherein the base skin is strengthened in an area of the stiffener stop creating a strengthened area, said stiffener stop being secured onto said strengthened area.

7. The stiffened panel according to claim 6, wherein the strengthened area comprises an extra thickness of the base skin.

8. The stiffened panel according to claim 6, wherein the strengthened area comprises a splice in an area of the base skin receiving the stiffener stop.

9. The stiffened panel according to claim 8, wherein the splice envelopes the stiffener stop at least at the second height of the second slope, with an end of the stiffener fitting into a slit located in the splice.

10. An aircraft assembly comprising:
an aircraft having at least one stiffened composite panel with at least one stiffener secured thereto, the stiffener comprising:
a longitudinal core having a first longitudinal edge directly secured to an outer base skin of the composite panel substantially along an entirety of the first longitudinal edge, an opposed second edge having a height with respect to the first edge, and opposed side surfaces extending between said first edge and said second edge substantially along an entirety of the core, said core having two opposed longitudinal end portions
wherein the longitudinal end portions form longitudinal stiffener stops of the stiffener, wherein at least one of said longitudinal stiffener stops comprises first and second slopes separated by a plateau, said first slope starting at the second edge at a first height and descending to a first intermediate point on the second edge at a second height less than the first height, the plateau extending from the first intermediate point to a second intermediate point on the second edge, and the second slope descending from the second intermediate point to the base skin.

* * * * *